US012756210B2

(12) United States Patent
Yang et al.

(10) Patent No.: US 12,756,210 B2
(45) Date of Patent: Oct. 6, 2026

(54) CHARGING DEVICE AND CHARGING SYSTEM

(71) Applicant: Nanjing Chervon Industry Co., Ltd., Nanjing (CN)

(72) Inventors: Dong Yang, Nanjing (CN); Henghui Song, Nanjing (CN); Cunrong Huang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 738 days.

(21) Appl. No.: 18/312,734

(22) Filed: May 5, 2023

(65) Prior Publication Data

US 2023/0318322 A1 Oct. 5, 2023

Related U.S. Application Data

(63) Continuation of application No. PCT/CN2021/131717, filed on Nov. 19, 2021.

(30) Foreign Application Priority Data

Dec. 11, 2020 (CN) ........................ 202011446830.9
Dec. 11, 2020 (CN) ........................ 202011453454.6

(51) Int. Cl.
*H02J 7/60* (2026.01)
*H02J 7/44* (2026.01)
*H02J 7/70* (2026.01)

(52) U.S. Cl.
CPC .................. *H02J 7/60* (2026.01); *H02J 7/44* (2026.01); *H02J 7/70* (2026.01)

(58) Field of Classification Search
CPC ................... H02J 7/60; H02J 7/70; H02J 7/44
(Continued)

(56) References Cited

U.S. PATENT DOCUMENTS 6,392,387 B1 * 5/2002 Sage ....................... H02J 7/663 320/136
2003/0085685 A1 * 5/2003 Usui ....................... H02J 7/751 320/112
(Continued)

FOREIGN PATENT DOCUMENTS

CN 100589304 C 2/2010
CN 201754507 U 3/2011
(Continued)

OTHER PUBLICATIONS

ISA/CN, Int. Search Report issued on PCT application No. PCT/CN2021/131717, dated Feb. 9, 2022, 3 pages.
(Continued)

*Primary Examiner* — Suchin Parihar
(74) *Attorney, Agent, or Firm* — Greenberg Traurig, LLP

(57) ABSTRACT

A charging device includes: a power interface configured to access a power supply; and a charging interface configured to be detachably connected to a battery pack. The charging interface includes: a charging terminal configured to be connected to a charging terminal of the battery pack; a communication terminal configured to be connected to a communication terminal of the battery pack; and a communication module receiving the communication information of the battery pack. The charging device further includes a communication protection module connected between the communication terminal and the communication module and configured to isolate an interference voltage signal higher than or equal to a preset voltage value to protect the communication module.

14 Claims, 10 Drawing Sheets

(58) Field of Classification Search
USPC .......................................................... 320/112
See application file for complete search history.

(56) References Cited

U.S. PATENT DOCUMENTS

| | | | | |
|---|---|---|---|---|
| 2005/0088142 A1* | 4/2005 | Chen | H02J 7/92 320/128 |
| 2018/0287406 A1* | 10/2018 | Couvillon | H02J 7/865 |

FOREIGN PATENT DOCUMENTS

| | | | |
|---|---|---|---|
| CN | 106786890 A | 5/2017 |
| CN | 107204655 A | 9/2017 |
| CN | 104967201 B | 10/2018 |
| CN | 111740471 A | 10/2020 |
| CN | 111769605 A | 10/2020 |

OTHER PUBLICATIONS

ISA/CN, English translation of Int. Search Report issued on PCT application No. PCT/CN2021/131717, dated Feb. 9, 2022, 2 pages.
ISA/CN, Written Opinion issued on PCT application No. PCT/CN2021/131717, dated Feb. 9, 2022, 3 pages.
ISA/CN, English translation of Written Opinion issued on PCT application No. PCT/CN2021/131717, dated Feb. 9, 2022, 3 pages.

* cited by examiner

| Signal emission terminal | Level state | Conduction state of S1 | Conduction state of S2 |
| --- | --- | --- | --- |
| TX1 | 1 | Off | Off |
| | 0 | On | Off |
| TX2 | 1 | Off | Off |
| | 0 | Off | On |

FIG. 3

CHARGING DEVICE AND CHARGING SYSTEM

This application is a continuation of International Application Number PCT/CN2021/131717, filed on Nov. 19, 2021, through which this application also claims the benefit under 35 U.S.C. § 119 (a) of Chinese Patent Application No. 202011446830.9, filed on Dec. 11, 2020, and Chinese Patent Application No. 202011453454.6, filed on Dec. 11, 2020, which applications are incorporated herein by reference in their entirety.

BACKGROUND

Typically, when a charger charges a rechargeable battery pack such as a lithium battery pack, in addition to providing a charging voltage and current, it generally acquires the current state of the battery pack in various manners. A battery pack parameter of the battery pack is acquired commonly through 1-wire bus communication, that is, a communication port D. A voltage which the communication port D can generally withstand is a digital level. When a voltage exceeding the limit value of the digital level is loaded onto the communication port, the communication port is damaged, and the charger cannot be used continuously. For example, when the communication port D is short-circuited to the positive output terminal of the charger, a battery pack voltage higher than the limit value of the digital level exists at the port D. In addition, an instant high voltage is generated at the communication port D at the moment when the battery pack is plugged/unplugged or by static electricity in the environment, damaging components in the charger and preventing the charger from being used continuously.

SUMMARY

A charging device includes: a housing; a power interface configured to access a power supply; and a charging interface disposed on the housing and detachably connected to a battery pack. The charging interface includes: a charging terminal configured to be connected to a charging terminal of the battery pack; a communication terminal configured to be connected to a communication terminal of the battery pack to acquire communication information of the battery pack; and a communication module receiving the communication information of the battery pack inputted via the communication terminal. The charging interface further includes a communication protection module connected between the communication terminal and the communication module and configured to isolate an interference voltage signal higher than or equal to a preset voltage value to protect the communication module.

In one example, the voltage of the interference voltage signal is higher than the supply voltage of the communication module.

In one example, the communication protection module includes: a first protection unit connected between the communication terminal and the communication module and configured to isolate a first interference voltage signal higher than or equal to a first preset voltage value to protect the communication module; and a second protection unit disposed between the first protection unit and the communication terminal to absorb a second interference voltage signal higher than or equal to a second preset voltage value to protect the communication module.

In one example, the first interference voltage signal is a continuous high-voltage signal, and the second interference voltage signal is an instant high-voltage signal.

In one example, the voltage of the first interference voltage signal is lower than the voltage of the second interference voltage signal; and the first preset voltage value is less than the second preset voltage value.

In one example, the first protection unit includes a Schottky diode.

In one example, the second protection unit includes a Transient Voltage Suppressor (TVS).

In one example, the second protection unit includes a varistor.

In one example, 1-wire bus communication is performed between the communication terminal of the charging device and the communication terminal of the battery pack.

A charging system includes a battery pack and the preceding charging device.

A charging device includes: a housing; a fan disposed in the housing; a fan motor having multiple phase windings and capable of driving the fan to rotate; a driver circuit having multiple switching elements and configured to output a switching signal to drive the fan motor to rotate; a power interface configured to access a power supply to supply a power supply voltage to the driver circuit; and a controller electrically connected to at least the driver circuit and the fan. The controller is configured to: acquire a state parameter of the fan; when the state parameter is less than or equal to a parameter threshold, control the fan to reduce a rotational speed; and control, after a preset time period, the fan to increase the rotational speed.

In one example, the controller is configured to: when a maintenance duration for which the state parameter is less than or equal to the parameter threshold is greater than or equal to a duration threshold, control the fan to reduce the rotational speed.

In one example, the state parameter of the fan includes the rotational speed or an operating current.

In one example, the reduction of the rotational speed by the fan includes the case where the fan stops rotating, the fan reduces the rotational speed to a first preset rotational speed and maintains rotation at the first preset rotational speed, or the fan reduces the rotational speed to a first preset rotational speed, maintains rotation at the first preset rotational speed for a certain time period, and then stops rotating; and the increase of the rotational speed by the fan includes the case where the fan changes from the state of stopping rotating to a rotating state or the fan increases the first preset rotational speed to a second preset rotational speed.

In one example, the charging device further includes: a charging port disposed on the housing to access a charging terminal of a battery pack and providing an interface for charging the battery pack; and a power supply conversion module connected between the charging port and the controller to convert the accessed power supply into charging electric energy to charge the battery pack.

In one example, the charging device further includes: a communication port disposed on the housing to access a communication terminal of a battery pack to acquire a battery pack parameter of the battery pack; and a charging indication module disposed on the housing to display a charging state of the battery pack.

In one example, the battery pack parameter includes the quantity of electricity charged into the battery pack.

In one example, the controller is configured to: when the quantity of electricity charged into the battery pack meets a first electric quantity threshold, control the charging indication module to output and display a first charging state; and when the quantity of electricity charged into the battery pack meets a second electric quantity threshold, control the charging indication module to output and display a second charging state; where the first electric quantity threshold is less than the second electric quantity threshold.

A control method of a charging device is provided. The charging device includes a housing, a fan disposed in the housing, a fan motor driving the fan to rotate, a driver circuit driving the fan motor to rotate, a power interface accessing a power supply to supply power to the driver circuit, and a controller. The control method includes: acquiring the rotational speed of the fan; when a state parameter is less than or equal to a parameter threshold, controlling the fan to reduce the rotational speed; and controlling, after a preset time period, the fan to increase the rotational speed.

In one example, when a maintenance duration for which the state parameter is less than or equal to the parameter threshold is greater than or equal to a duration threshold, the fan is controlled to reduce the rotational speed.

BRIEF DESCRIPTION OF DRAWINGS

FIG. 3 is a schematic diagram showing the on-off conversion of a switch as an example;

DETAILED DESCRIPTION

Figure 1:
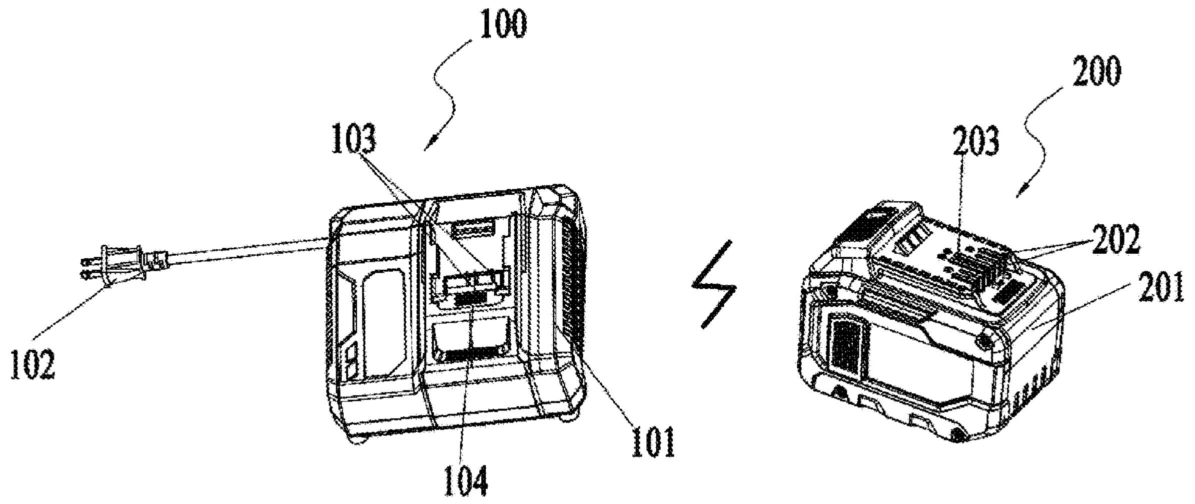
FIG. 1 is a structural view of a charging system as an example.

The present application is described below in detail in conjunction with drawings and examples. It is to be understood that the examples described herein are intended to explain the present application and not to limit the present application. Additionally, it is to be noted that to facilitate description, only part, not all, of structures related to the present application are illustrated in the drawings.

Charging devices to which technical solutions of the present application are applicable may charge different types of rechargeable battery packs including, but not limited to, lithium battery packs.

Figure 2:
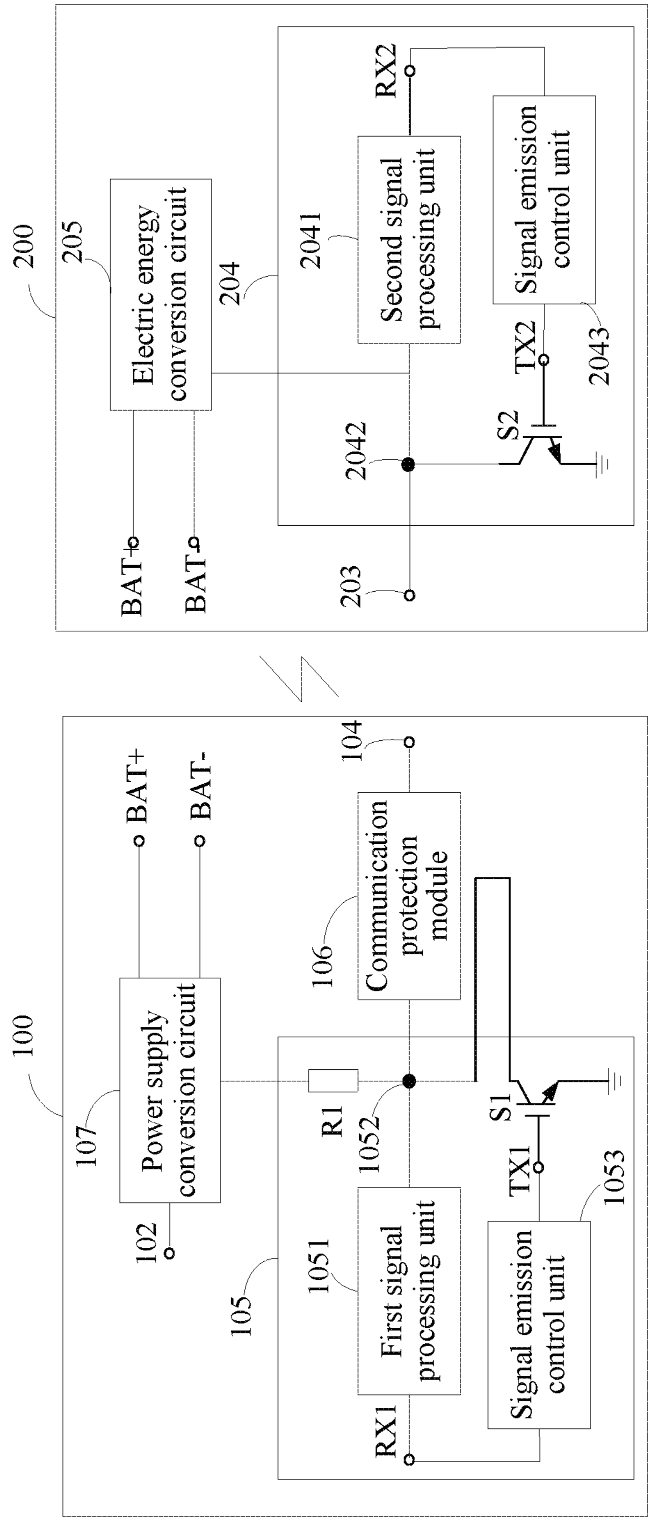
FIG. 2 is a circuit block diagram of a charging system as an example.

Referring to FIGS. 1 and 2, a charging system includes a charging device 100 and a battery pack 200. The charging device 100 includes at least a housing 101, a power interface 102, charging terminals 103, a communication terminal 104, a communication module 105, a communication protection module 106, and a power supply conversion circuit 107. The battery pack 200 includes at least a housing 201, charging terminals 202, a communication terminal 203, and a communication module 204.

Figure 15:
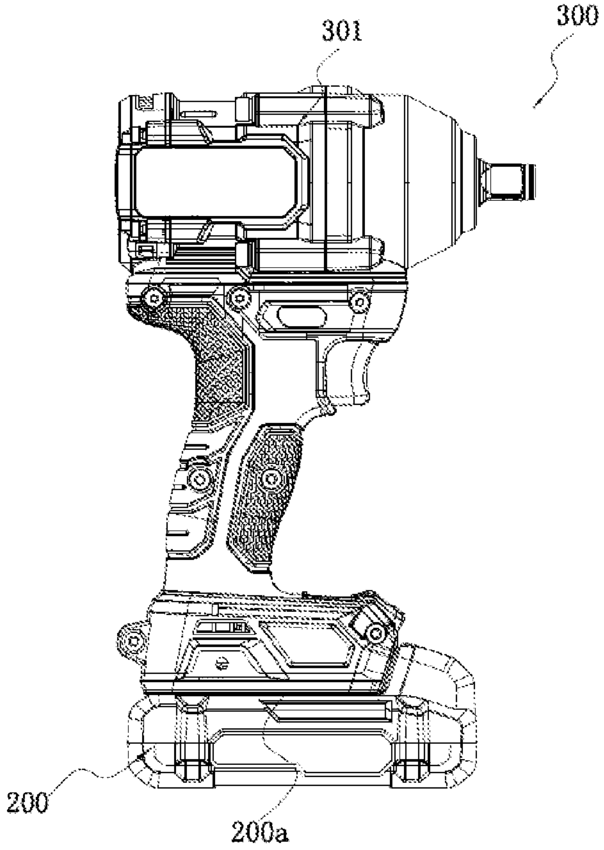
FIG. 15 is a structural view of an electric tool as an example.

Referring to FIGS. 1 and 15, the battery pack 200 is used to provide energy for an electric tool 300. The electric tool 300 comprises a too body 301 and the battery pack 200, the battery pack 200 is detachably connected to the too body 301 through a battery pack interface 200*a*.

The power interface 102 is configured to access a power supply. In this example, an alternating-current (AC) power supply may be selected as the power supply, and the power interface 102 may access alternating-current mains of 120 V or 220 V. It is to be understood by those skilled in the art that the power interface 102 is connected to the power supply conversion circuit 107 so that an accessed alternating current is converted into charging electric energy suitable for charging the battery pack 200 and auxiliary electric energy for supplying power to components in the charging device 100, for example, electric energy for supplying power to the communication module 105. It is to be understood that the power supply conversion circuit 107 may include at least an AC/direct current (DC) module. In an alternative implementation, the power interface 102 may access a photovoltaic panel, and the power supply conversion circuit 107 may convert light energy into the charging electric energy suitable for charging the battery pack and the auxiliary electric energy for supplying power to the components in the charging device. It is to be understood that the power supply conversion circuit 107 may include a maximum power point tracking (MPPT) module, that is, a module converting the light energy into the electric energy. In this example, the plug of a power cord is connected to the housing 101 and used as the power interface. In an alternative implementation, the power interface 102 may be another form of interface, which is not limited herein.

The charging terminals 103 are disposed on the housing 101 and detachably connected to the charging terminals 202 of the battery pack 200. The communication terminal 104 may be configured to be adjacent to the charging terminals 103 and is detachably connected to the communication terminal 203 of the battery pack 200. In this example, as shown in FIGS. 1 and 2, the charging terminals 103 include two terminals BAT+ and BAT−, and correspondingly, the charging terminal 202 on the battery pack also includes two terminals BAT+ and BAT−. In this example, the communication terminal 104 on the charging device is disposed between the two charging terminals 103. In this example, both the communication terminal 104 and the charging terminals 103 are metal connection pieces. It is to be understood by those skilled in the art that an electric energy conversion circuit 205 is connected to the charging terminals 202 of the battery pack 200 to convert and storage the charging electric energy to provide supply power for components in the battery pack.

The communication module 105 is disposed in the housing 101 and configured to receive, analyze, and process communication information of the battery pack sent by the battery pack 200. In this example, 1-wire bus communication is performed between the communication terminal 104 of the charging device 100 and the communication terminal 203 of the battery pack 200.

In a specific implementation, as shown in FIG. 2, the communication module 105 includes at least a resistor R1, a first switching element S1, a first signal processing unit 1051, a first node 1052, a signal receiving terminal RX1, a signal emission terminal TX1, and a signal emission control unit 1053, where the first node 1052 is connected to at least the communication protection module 105, the resistor R1, the first switching element S1, and the first signal processing unit 1051.

In this example, a node voltage at the first node 1052 is the supply voltage of the communication module 105. One end of the resistor R1 is connected to the power supply conversion circuit 107 so as to access electric energy for supplying power, and the other end of the resistor R1 is connected to the first node 1052 so as to maintain a high-voltage state at the first node 1052. That is to say, as long as a voltage signal inputted at the communication terminal 104 is not higher than the voltage at the first node, the communication terminal 104 can normally communicate. An input terminal of the first signal processing unit 1051 is connected to the first node 1052 to parse the communication information of the battery pack 200 according to the voltage state of the first node and a preset communication protocol, and the other terminal of the first signal processing unit 1051 is connected to the signal receiving terminal RX1 so that the communication information of the battery pack can be sent to the signal receiving terminal RX1. The signal receiving terminal RX1 transmits the communication information of the battery pack to the signal emission control unit 1053. The signal emission control unit 1053 is connected between the signal receiving terminal RX1 and the signal emission terminal TX1 and may generate feedback information according to the communication information of the battery pack and send the feedback information to the signal emission terminal TX1. The signal emission terminal TX1 is connected between the signal emission control unit 1053 and the first switching element S1 and may control the conduction state of the first switching element S1 according to the feedback information, thereby changing the voltage state at the first node 1052. The emitter of the first switching element S1 is grounded, the base of the first switching element S1 is connected to the signal emission terminal TX1, and the collector of the first switching element S1 is connected to the first node 1052. When the first switching element S1 is turned on, a low-voltage state is at the first node, and when the first switching element S1 is turned off, the high-voltage state is maintained at the first node, that is, the supply voltage of the communication module is maintained.

In this example, a high voltage at the first node corresponds to a high-level digital signal in the communication information and is typically denoted by the number 1, and a low voltage at the first node corresponds to a low-level digital signal in the communication information and is typically denoted by the number 0.

Accordingly, the communication module 204 in the battery pack 200 includes at least a second switching element S2, a second signal processing unit 2041, a second node 2042, a signal receiving terminal RX2, a signal emission terminal TX2, and a signal emission control unit 2043. Since internal structures of the communication module 204 in the battery pack are similar to internal structures of the communication module 105 in the charging device 100, for the process in which the communication module 204 transmits and processes a signal, reference may be made to the description of the communication module 105, and the details are not repeated here.

In this example, the first switching element S1 and the second switching element S2 may be controllable semiconductor power devices (for example, field-effect transistors (FETs), bipolar junction transistors (BJTs), or insulated-gate bipolar transistors (IGBTs)) or may be any other types of solid-state switches, for example, the insulated-gate bipolar transistors (IGBTs) or the bipolar junction transistors (BJTs).

In an example, in the process in which the charging interface of the charging device 100 is plugged into the battery pack 200 so that the battery pack is charged, the voltage at the first node 1052 of the charging device 100 always maintains a supply-voltage state, that is, the high-voltage state before the communication information is transmitted. The preceding communication information may include request information or feedback information in a communication process, such as request information of the charging device and parameter information such as a charged electric quantity fed back by the battery pack. When the charging device 100 and the battery pack 200 communicate with each other, the signal emission terminal TX1 of the charging device 100 switches the voltage at the first node between the high voltage and the low voltage by controlling the first switching element S1 to be turned off or on, thereby generating a high-level signal or a low-level signal, and the high-level signal or the low-level signal is transmitted to the communication terminal 203 of the battery pack 200 through the communication terminal 104 of the charging device 100. In addition, when the charging device 100 receives the communication information emitted by the battery pack, the first switching element S1 is always in an off state so that the high voltage is maintained at the first node 1052 and the communication link from the first node 1052 to the communication terminal 104 is unblocked and normal communication is maintained. The second switching element S2 on the side of the battery pack is turned on or off, which changes a voltage state at the second node 2042. Thus, a voltage level at the second node 2042 is changed, thereby transmitting the communication information of the battery pack to the charging device.

Specifically, during the communication between the charging device 100 and the battery pack 200, on/off states of the first switching element S1 and the second switching element S2 are shown in FIG. 3. The process in which the charging device 100 sends the high-level signal or the low-level signal to the battery pack 200 is as follows: when the charging device 100 sends the high-level signal to the battery pack 200, the first switching element S1 is in the off state, the node voltage at the first node 1052 is the high voltage, and the second switching element S2 of the battery pack 200 is also in the off state so that a node voltage at the second node 2042 is also a high voltage and the second signal processing unit 2041 detects the high-level signal; and when the charging device 100 sends the low-level signal to the battery pack 200, the first switching element S1 is in an on state, the node voltage at the first node 1052 is the low voltage, and the second switching element S2 is in the off state so that the node voltage at the second node 2042 is a low voltage and the second signal processing unit 2041 detects the low-level signal. Similarly, the process in which the charging device 100 receives a high-level signal or a low-level signal sent by the battery pack 200 is as follows: when the battery pack 200 sends the high-level signal, the second switching element S2 is turned off, the first switching element S1 is also turned off, the node voltage at the second node 2042 is the high voltage, the node voltage at the first node 1052 is the high voltage, and the first signal processing unit 1051 detects the high-level signal; and when the battery pack 200 sends the low-level signal, the second switching element S2 is turned on, the first switching element S1 is turned off, the node voltage at the second node 2042 is the low voltage, and the node voltage at the first node 1052 is also the low voltage, and the first signal processing unit 1051 detects the low-level signal.

It is to be understood that the first signal processing unit 1051 may restore a state parameter of the battery pack by processing the detected high-level and low-level signals, and the second signal processing unit 2041 may restore the request information or instruction information of the charging device or the like by processing the detected high-level and low-level signals.

Figure 4:
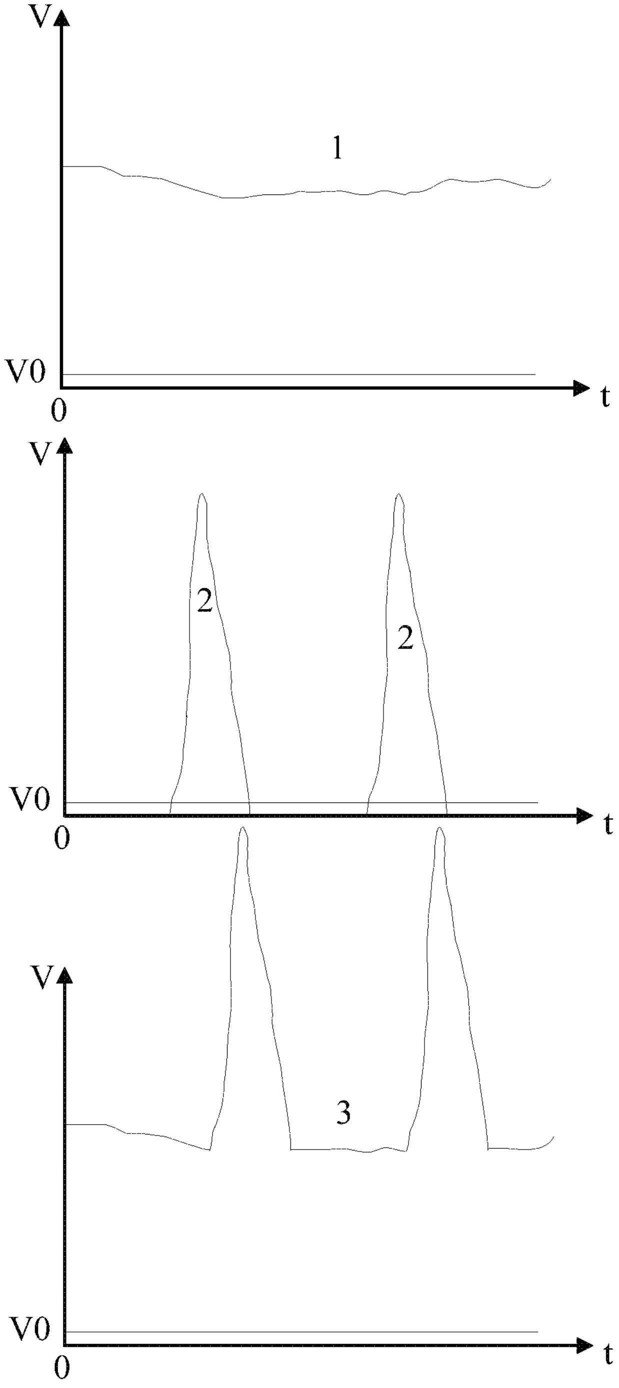
FIG. 4 is a schematic diagram showing waveforms of high voltages as an example.

It is to be noted that high and low levels which the communication terminal 104 of the charging device can recognize are in a limited range, and if interference exists on a communication loop or contact impedance increases, the communication is unreliable or even the communication cannot be performed. For example, the connection piece of the communication terminal 104 is short-circuited to the connection piece of the charging terminal 103, which applies a continuous high voltage (generally the charging voltage of the battery pack) to the communication port, or the charging terminal 202 of the battery pack 200 is short-circuited to the communication terminal 203 of the battery pack 200, which also indirectly causes the communication terminal 104 of the charging device 100 to receive the continuous high voltage. For example, an instant high voltage (generally a high voltage at a kilovolt level) is applied to the communication terminal 104 at the moment when the battery pack is plugged and unplugged or due to damage from foreign matter and water vapor. As shown in FIG. 4, the communication terminal 104 may face three forms of high voltages, including a single continuous high voltage, a single instant high voltage, or both the continuous high voltage and the instant high voltage. A voltage V0 in FIG. 4 denotes the maximum voltage which the components in the charging device can withstand, for example, 3.3 V or 5.5 V. Line 1 denotes a possible waveform of the continuous high voltage, line 2 denotes a possible waveform of the instant high voltage, and line 3 denotes a possible waveform of high voltages when the continuous high voltage and the instant high voltage are both present. In the preceding cases, the communication terminal 104 cannot communicate normally, and the back-end circuit of the communication terminal 104 is also damaged due to the high voltage. In order to prevent damage to the back-end circuit of the communication terminal 104 caused by the continuous high voltage or the instant high voltage, the communication protection module 106 is connected between the communication terminal 104 and the communication module 105 in the examples of the present application.

The communication protection module 106 can isolate an interference voltage signal higher than or equal to a preset voltage value to protect the communication module 105, where the voltage of the interference voltage signal is higher than the supply voltage of the communication module. In this example, the supply voltage of the communication module is the node voltage at the first node 1052. That is to say, when the voltage signal inputted at the communication terminal 104 is higher than the voltage signal at the first node, the communication cannot be performed normally.

Figure 5:
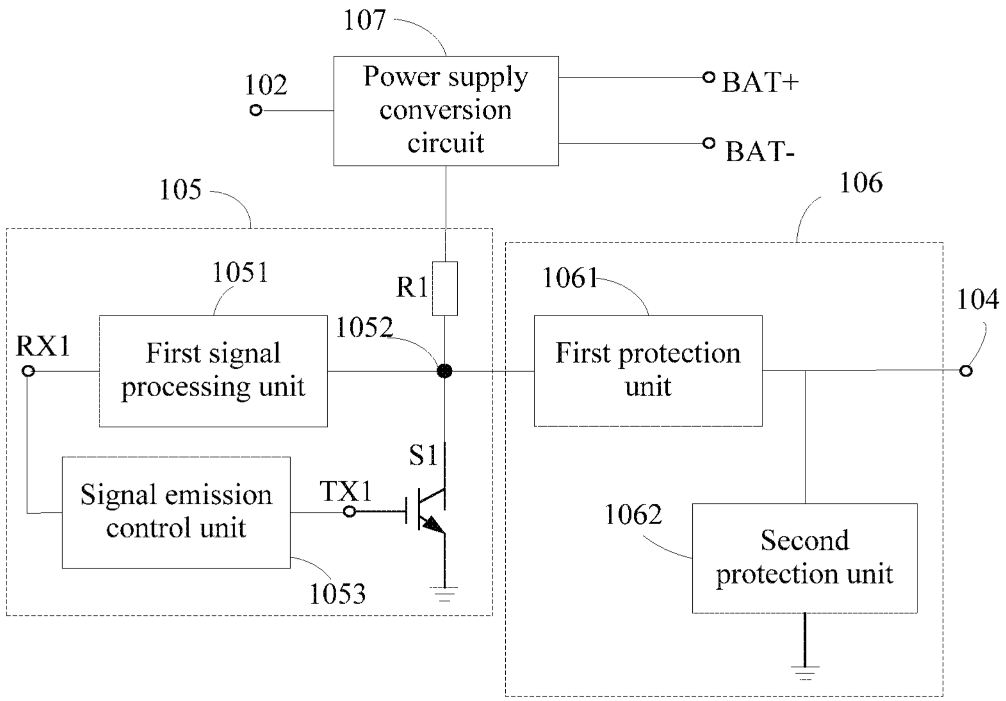
FIG. 5 is a circuit diagram of a charging device as an example.

In this example, as shown in FIG. 5, the communication protection module 106 includes at least a first protection unit 1061 and a second protection unit 1062. The first protection unit 1061 is connected between the communication terminal 104 and the communication module 105 and configured to isolate a first interference voltage signal higher than or equal to a first preset voltage value to protect the communication module 105. The second protection unit 1062 is disposed between the first protection unit 1061 and the communication terminal 104, that is to say, the second protection unit 1062 is disposed before the first protection unit 1061. The second protection unit 1062 can absorb a second interference voltage signal higher than or equal to a second preset voltage value to protect the communication module 105. In this example, the first interference voltage signal is a continuous high-voltage signal, the second interference voltage signal is an instant high-voltage signal, the voltage of the first interference voltage signal is lower than the voltage of the second interference voltage signal, and the first preset voltage value is less than the second preset voltage value. In an example, the voltage of the second interference voltage signal is the high voltage at the kilovolt level, and the voltage of the first interference voltage signal is the charging voltage of the battery pack.

Figure 6:
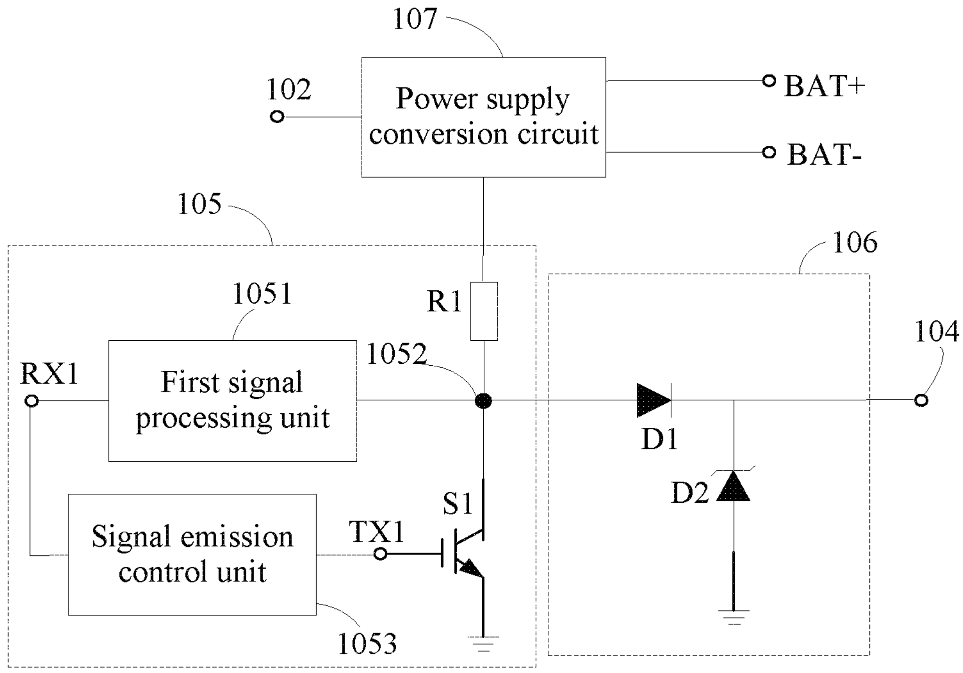
FIG. 6 is a circuit diagram of a charging device as an example.

In an example, as shown in FIG. 6, the first protection unit 1061 is an ordinary Schottky diode D1 and can isolate the continuous high voltage higher than the first preset voltage value. The second protection unit 1062 is a Transient Voltage Suppressor D2 (TVS) and can absorb the instant high voltage higher than the second preset voltage value. In this example, the negative electrode of the diode D1 is connected to the communication terminal 104, the positive electrode of the diode D1 is connected to the first node 1052, the negative electrode of the diode D2 is connected to the communication terminal 104, and the positive electrode of the diode D2 is grounded. In this example, when both the continuous high voltage and the instant high voltage are inputted into the communication terminal 104, the second protection unit 1062 first absorbs the instant high voltage. It is to be noted that when the voltage at the communication terminal 104 is normal, that is, a communication function is normal, the diode D1 has very low internal resistance and a relatively low voltage drop, which does not affect the states of the high and low levels at the first node 1052 recognized by the first signal processing unit 1061.

Figure 7:
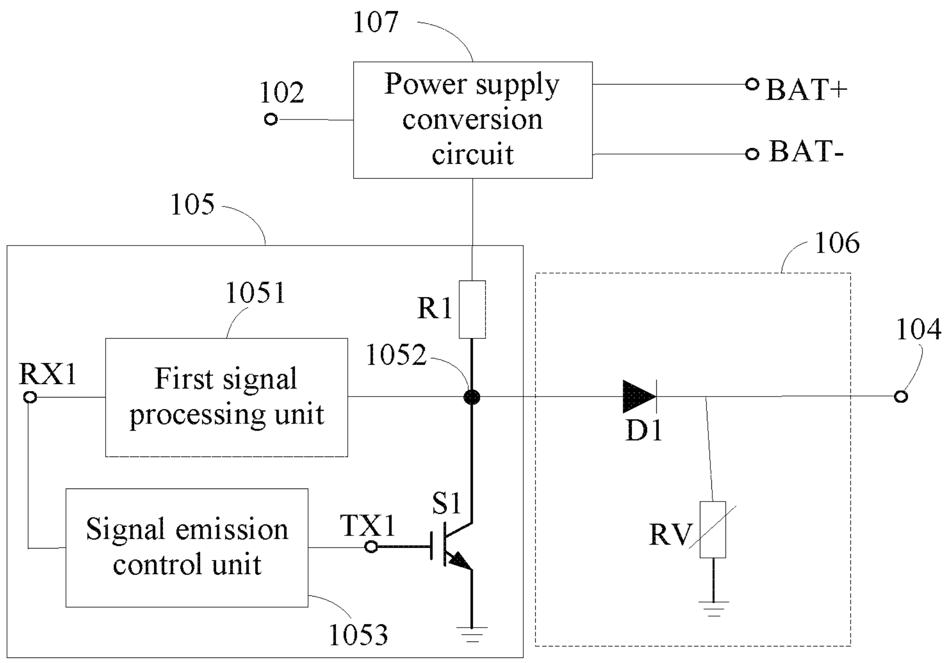
FIG. 7 is a circuit diagram of a charging device as an example.

In an example, as shown in FIG. 7, the second protection unit 1062 is a varistor RV and also can block the instant high voltage higher than a preset voltage. One end of the varistor RV is connected to the negative electrode of the diode D1, and one end of the varistor RV is grounded. When the instant high voltage is inputted, the varistor RV can clamp the voltage to absorb an excessive current to protect back-end electronic components.

It is to be noted that variations of other components or circuits with the characteristic that the first protection unit 1061 blocks the continuous high voltage also fall within the scope of the present application, and variations of other components or circuits with the characteristic that the second protection unit 1062 absorbs the instant high voltage also fall within the scope of the present application.

In an example, the battery pack 200 is plugged into the charging device 100 to be charged, and both the battery pack 200 and the charging device 100 may perform the interaction of the communication information at the same time. When the battery pack 200 and the charging device 100 communicate with each other, the conduction direction of the first protection unit 1061, that is, the diode D1, is opposite to the direction in which the communication terminal 104 transmits information to the charging device. Therefore, in this example, in order to ensure the normal communication function of the communication device, the resistor R1 is connected to the power supply conversion circuit 107 to increase the supply voltage at the first node 1052. Thus, the high voltage is maintained at the first node 1052 during the communication and the voltage at the first node 1052 is switched between the high voltage and the low voltage according to the conduction state of the first switching element S1 so that the communication information is transmitted.

Figure 8:
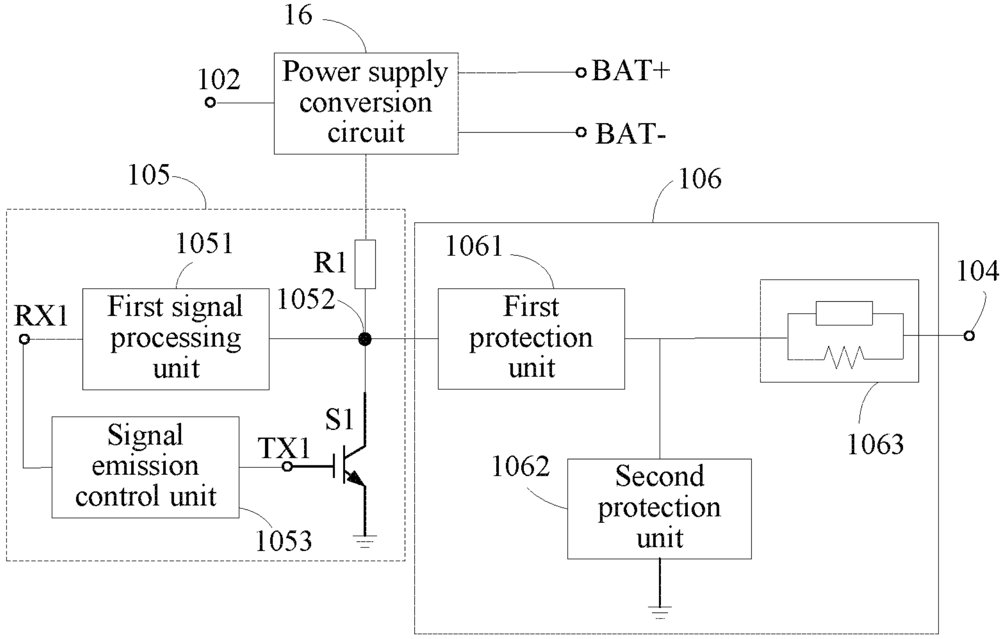
FIG. 8 is a circuit diagram of a charging device as an example.

In an example, as shown in FIG. 8, the communication protection module 106 may further include a third protection unit 1063. The third protection unit 1063 is connected before the first protection unit 1061 and the second protection unit 1062. Specifically, the third protection unit 1063 includes an anti-impact resistor and a resettable fuse which are connected in parallel.

In the examples of the present application, a communication protection circuit is provided so that on the basis of ensuring the normal communication, the interference voltage signal such as the continuous high voltage or the instant high voltage is prevented from damaging the communication loop so that the safety of the charging device is improved and the stability of the communication is ensured.

Figure 9:
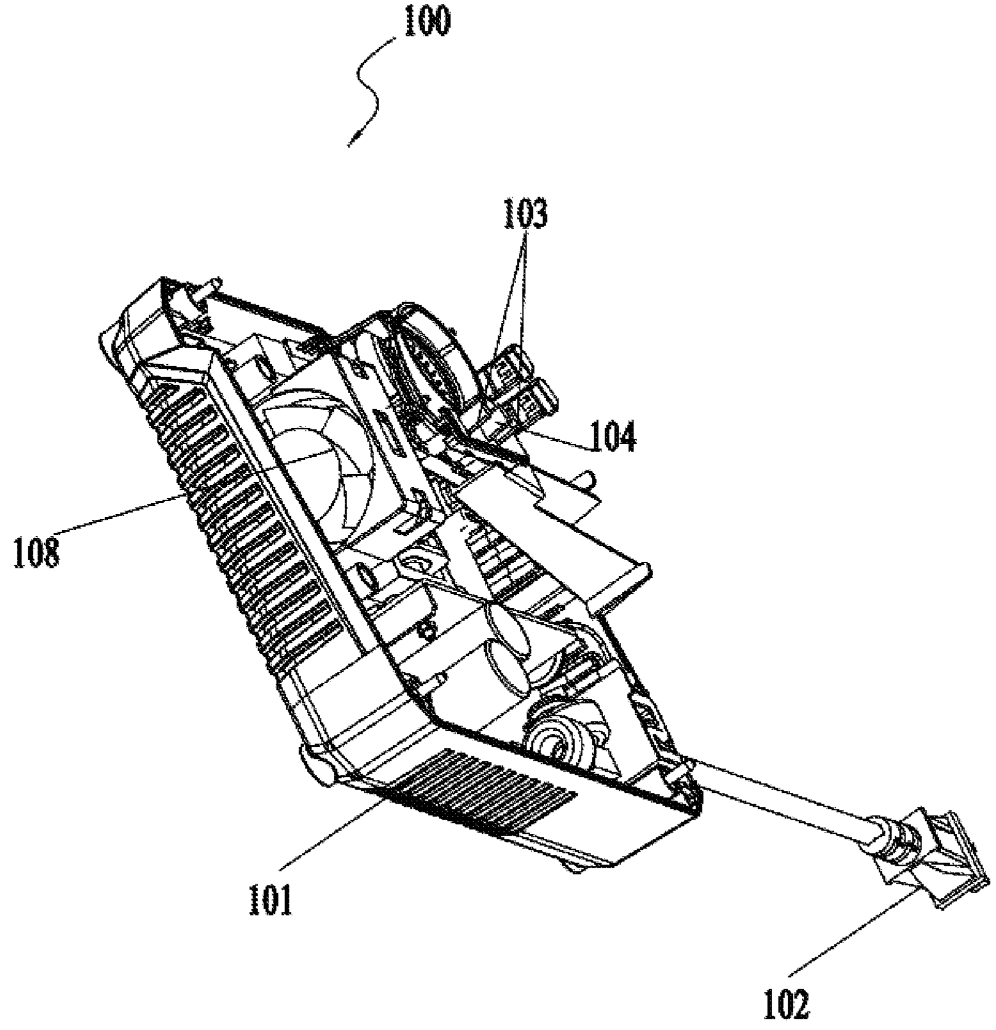
FIG. 9 is a structural view of a charging device as an example.
Figure 10:
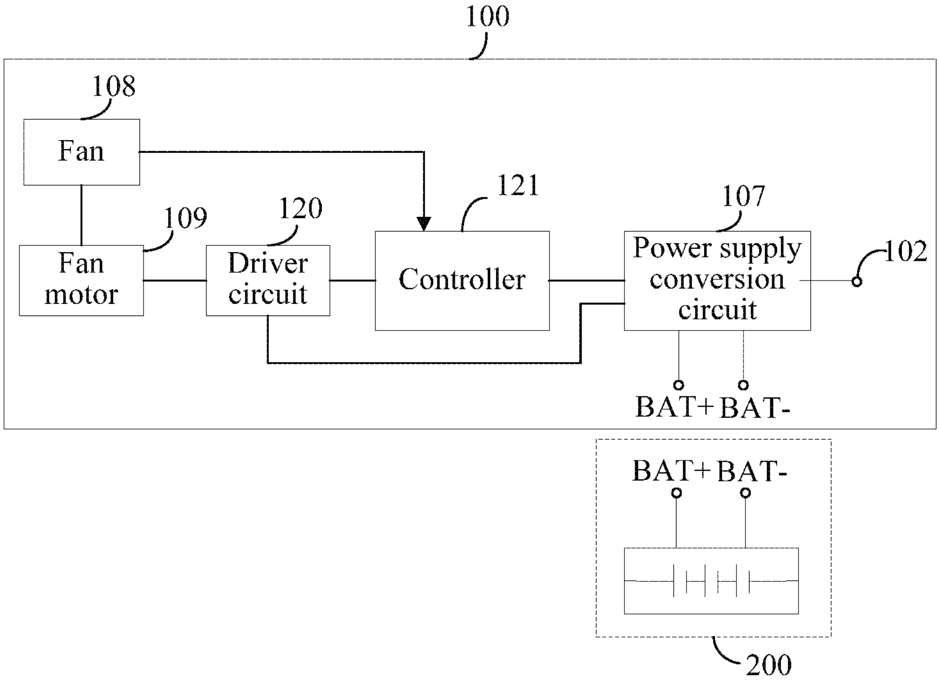
FIG. 10 is a circuit diagram of a charging system as an example.

Referring to FIGS. 9 and 10, the charging device 100 in the charging system is shown. The charging device 100 further includes at least a fan 108, a fan motor 109, a driver circuit 120, and a controller 121.

The fan 108 is disposed in the housing 101 to dissipate the heat of power devices or power loops in the charging device 100, for example, the fan 108 may dissipate the heat of the fan motor.

In this example, the fan motor 109 may be a sensorless brushless motor, for example, a three-phase brushless motor, and triangular or star-shaped connections are adopted among three-phase stator windings of the motor. The fan motor 109 provides a power source for the fan 108 to drive the fan 108 to rotate.

Figure 11:
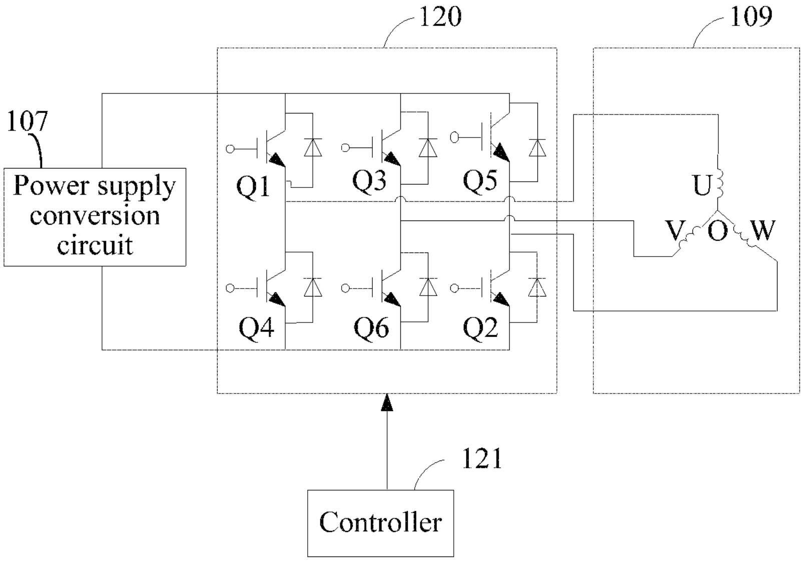
FIG. 11 is a schematic diagram of a driver circuit in a charging device as an example.

The driver circuit 120 is electrically connected to stator windings of the fan motor 109 and configured to transmit a current from the power interface 102 to the stator windings to rotate the fan motor 109. As an example, as shown in FIG. 11, the driver circuit 120 includes multiple switching elements Q1, Q2, Q3, Q4, Q5, and Q6. Each gate terminal of a switching element is electrically connected to the controller 121 and configured to receive a control signal from the controller 121. Each drain or source of the switching element is connected to the stator windings of the fan motor 109. The switching elements Q1 to Q6 receive control signals from the controller 121 to change respective conduction states, thereby changing a current loaded on the stator windings of the fan motor 109 by the power supply. In an example, the driver circuit 120 may be a three-phase bridge driver circuit including six controllable semiconductor power devices (such as the FETs, the BJTs, or the IGBTs). It is to be understood that the preceding switching elements may be any other types of solid-state switches such as the insulated-gate bipolar transistors (IGBTs) or the bipolar junction transistors (BJTs).

To rotate the fan motor 109, the driver circuit 120 has multiple driving states. In one driving state, the stator windings of the fan motor 109 generate a magnetic field, the controller 121 outputs corresponding PWM control signals to the switch elements in the driver circuit 120 according to the position of the rotor or the back electromotive force of the motor so that the driving state of the driver circuit 120 is switched and thus the stator windings generate a changing magnetic field to drive the rotor to rotate, thereby causing the fan motor 109 to rotate, stop rotating, or perform commutation. It is to be noted that any other circuits and control manners which can drive the fan motor 109 to rotate, stop rotating, or perform the commutation are applicable to the present disclosure, and the circuit structure of the driver circuit 120 and the control of the driver circuit 120 by the controller 121 are not limited in the present disclosure.

The controller 121 is electrically connected to at least the driver circuit 121 and the fan 108. In a specific implementation, the controller 121 may acquire a state parameter of the fan 108 and monitor the relationship between the acquired parameter and a preset parameter threshold. Further, when monitoring that the state parameter is less than or equal to the parameter threshold, the controller 121 may control the fan to reduce a rotational speed, where the parameter threshold may be a rotational speed value, a voltage value, a current value, or the like indicative of a stall of the fan. The controller 121 controls the fan 108 to reduce the rotational speed, which may be understood as the following case: the controller 121 controls the fan 108 to reduce the rotational speed to a first preset rotational speed and maintain rotation at this value, the controller 121 controls the fan 108 to reduce the rotational speed to zero, that is, the controller 121 controls the fan 108 to stop rotating, or the controller 121 controls the fan 108 to reduce the rotational speed to a first preset rotational speed and maintain rotation at this value for a time period, and then controls the fan 108 to reduce its rotational speed to zero. In an example, the parameter threshold is a rotational speed threshold. Further, after a preset time period, the controller 121 controls the fan to increase the rotational speed. The controller 121 controls the fan 108 to increase the rotational speed, which may be understood as the following case: the controller 121 controls the fan 108 to change from the state of stopping rotating to a rotating state, that is, the rotational speed of the fan is increased from zero, or the controller 121 controls the fan 108 to increase the preceding first preset rotational speed to a second preset rotational speed. In the present application, the rotational speed of the fan is less than or equal to a first rotational speed threshold, which may be understood as the stall of the fan.

In an example, the controller 121 may also monitor a maintenance duration for which the state parameter of the fan is less than or equal to the parameter threshold, and when the maintenance duration is greater than or equal to a duration threshold, the controller 121 controls the fan 108 to reduce the rotational speed. That is, the fan is controlled to reduce the rotational speed after the fan stalls for a certain time. Further, after the preset time period when the rotational speed of the fan is reduced, the rotational speed of the fan may be increased again.

In an example, the preceding process may be understood as the case where when the fan 108 stalls, the controller 121 controls the fan 108 to stop rotating for a time period and then restarts the fan. It is to be understood that when the fan is restarted, the controller 121 may update the state parameter of the fan. For example, the controller 121 acquires the rotational speed of the fan again after the restart and repeats the preceding process, that is, compares whether the updated state parameter is less than or equal to the parameter threshold, and if yes, the controller 121 controls the fan to stop rotating and restarts the fan after the preset time period. That is to say, when the stall of the fan is detected, the fan may be controlled to restart intermittently. The fan is restarted intermittently so that the power supply consumption of the fan can be reduced.

For example, when monitoring that the rotational speed $V_f$ of the fan is less than or equal to a minimum limit $V_0$, the controller 121 determines a duration $T_m$ for which $V_f \leq V_0$, and when $T_m \leq T_1$, the controller 121 controls the fan to stop rotating. Further, the controller 121 monitors a duration $T_n$ for which the fan stops rotating, and when $T_n > T_2$, the controller 121 controls the fan to rotate again, that is, restarts the fan. The preceding process may be cyclically repeated during the rotation of the fan.

In this example, as shown in FIG. 10, the power supply conversion circuit 107 in the charging device 100 is disposed between the power interface 102 and the charging terminal 103 and may convert the power supply accessed by the power interface 102 into the charging electric energy to charge the battery pack 200. In this example, an auxiliary power supply outputted by the power supply conversion circuit 107 may supply power to the fan 108. In this example, when the fan stalls, the fan is controlled to start cyclically and intermittently, which can effectively help the fan restore normal rotation and reduces power supplied by the power supply of the fan, that is, the consumption of an auxiliary power supply loop.

In an optional implementation, when controlling the fan 108 to reduce the rotational speed, the controller 121 may control the electric energy output capability of the power supply conversion module 107 to be reduced so that the power supply consumption of a main output loop is reduced when the fan stalls.

Figure 12:
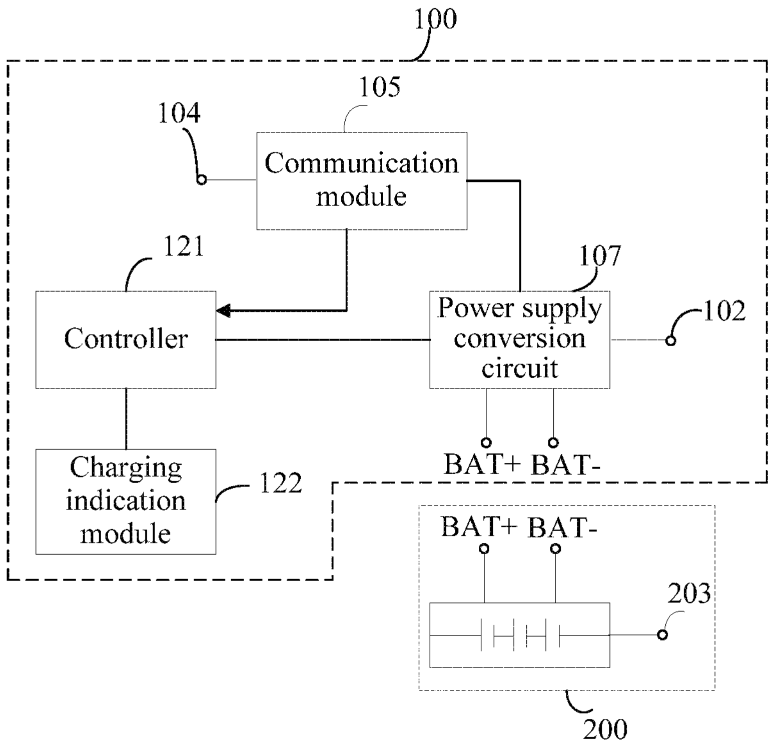
FIG. 12 is a circuit diagram of a charging system as an example.

In this example, as shown in FIG. 12, the charging device 100 further includes a charging indication module 122. The charging indication module 122 may be a device capable of reminding a user of a current quantity of electricity charged into the battery pack such as a charging signal indicator light or a charging display screen. In the related art, each time a rechargeable battery is fully charged, the service life of the battery is affected.

In this example, the communication terminal 104 may acquire a battery pack parameter of the battery pack, for example, the current quantity of electricity charged into the battery pack 200. Further, the communication module 105 may parse the quantity of electricity charged into the battery pack according to the communication protocol, and the controller 121 controls the display state of the charging indication module 122 according to the quantity of electricity charged into the battery pack. For example, when the quantity of electricity charged into the battery pack meets a first electric quantity threshold, the charging indication module is controlled to output and display a first charging state; and when the quantity of electricity charged into the battery pack meets a second electric quantity threshold, the charging indication module is controlled to output and display a second charging state; where the first electric quantity threshold is less than the second electric quantity threshold. For example, when detecting that the quantity of electricity charged into the battery pack approximates to 80%, the controller 121 controls the charging signal indicator light to flicker at a certain frequency, and when detecting that the quantity of electricity charged into the battery pack approximates to a full charge, the controller 121 controls the charging signal indicator light to be always on. The manner in which the charging indication module displays the charging state is not limited herein. Two electric quantity reminders are set so that the user can independently select the quantity of electricity charged into the battery pack, so as to meet the user's requirement for making a selection from increasing the service life of the battery and ensuring current use performance, both of which cannot be obtained.

Figure 13:
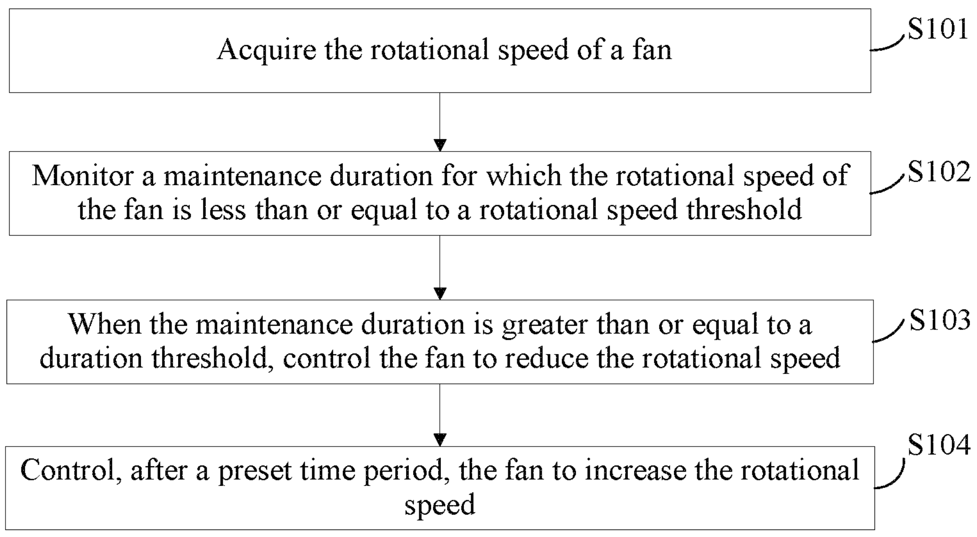
FIG. 13 is a flowchart of a control method of a fan in a charging device as an example.

With reference to FIG. 13, a flowchart of a control method applied to a fan in a charging device is described below. The method includes the steps described below.

In S101, the rotational speed of the fan is acquired.

In S102, a maintenance duration for which the rotational speed of the fan is less than or equal to a rotational speed threshold is monitored.

In S103, when the maintenance duration is greater than or equal to a duration threshold, the fan is controlled to reduce the rotational speed.

In S104, after a preset time period, the fan is controlled to increase the rotational speed.

Figure 14:
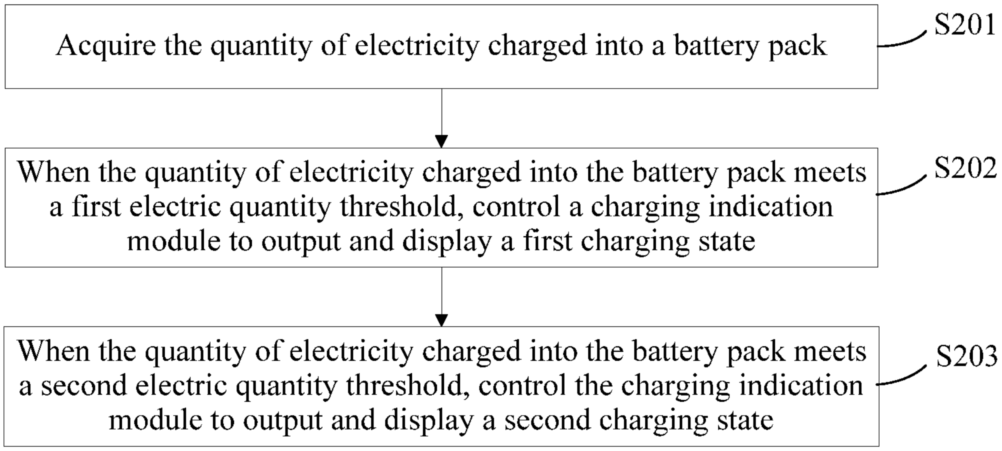
FIG. 14 is a flowchart of a control method of a charging indication module in a charging device as an example.

With reference to FIG. 14, a flowchart of a control method applied to the charging indication module in a charging device is described below. The method includes the steps described below.

In S201, the quantity of electricity charged into a battery pack is acquired.

In S202, when the quantity of electricity charged into the battery pack meets a first electric quantity threshold, the charging indication module is controlled to output and display a first charging state.

In S203, when the quantity of electricity charged into the battery pack meets a second electric quantity threshold, the charging indication module is controlled to output and display a second charging state.

The preceding manners may be executed by software programs written into a controller.

What is claimed is:

1. A charging device for charging a battery pack of an electric tool, comprising:

a housing;

a power interface configured to access a power supply; and a charging interface disposed on the housing and detachably connectable to the battery pack, wherein the charging interface comprises:

a charging terminal configured to be connected to a charging terminal of the battery pack;

a communication terminal configured to be connected to a communication terminal of the battery pack to acquire communication information of the battery pack;

a communication module for receiving the communication information of the battery pack inputted via the communication terminal; and a communication protection module connected between the communication terminal and the communication module and configured to isolate an interference voltage signal higher than or equal to a preset voltage value to protect the communication module, and wherein the communication protection module comprises:

a first protection unit connected between the communication terminal and the communication module and configured to isolate a first interference voltage signal higher than or equal to a first preset voltage value to protect the communication module; and a second protection unit disposed between the first protection unit and the communication terminal to absorb a second interference voltage signal higher than or equal to a second preset voltage value to protect the communication module.

2. The charging device according to claim 1, wherein a voltage of the interference voltage signal is higher than a supply voltage of the communication module.

3. The charging device according to claim 1, wherein the first interference voltage signal is a continuous high-voltage signal, and the second interference voltage signal is an instant high-voltage signal.

4. The charging device according to claim 1, wherein a voltage of the first interference voltage signal is lower than a voltage of the second interference voltage signal, and the first preset voltage value is less than the second preset voltage value.

5. The charging device according to claim 1, wherein the first protection unit comprises a Schottky diode.

6. The charging device according to claim 1, wherein the second protection unit comprises a Transient Voltage Suppressor (TVS).

7. The charging device according to claim 1, wherein the second protection unit comprises a varistor.

8. The charging device according to claim 1, wherein 1-wire bus communication is performed between the communication terminal of the charging device and the communication terminal of the battery pack.

9. The charging device according to claim 1, wherein the communication protection module further comprises a third protection unit connected before the first protection unit and the second protection unit, and the third protection unit comprises an anti-impact resistor and a resettable fuse which are connected in parallel.

10. A charging system, comprising:
- a battery pack; and
- a charging device;
- wherein the charging device comprises:
  - a housing;
  - a power interface configured to access a power supply; and
  - a charging interface disposed on the housing and detachably connectable to the battery pack;
- wherein the charging interface comprises:
  - a charging terminal configured to be connected to a charging terminal of the battery pack;
  - a communication terminal configured to be connected to a communication terminal of the battery pack to acquire communication information of the battery pack; and
  - a communication module for receiving the communication information of the battery pack inputted via the communication terminal;
- wherein the charging interface further comprises:
  - a communication protection module connected between the communication terminal and the communication module and configured to isolate an interference voltage signal higher than or equal to a preset voltage value to protect the communication module wherein the communication protection module comprises:
  - a first protection unit connected between the communication terminal and the communication module and configured to isolate a first interference voltage signal higher than or equal to a first preset voltage value to protect the communication module; and
  - a second protection unit disposed between the first protection unit and the communication terminal to absorb a second interference voltage signal higher than or equal to a second preset voltage value to protect the communication module.

11. The charging system according to claim 10, wherein the first interference voltage signal is a continuous high-voltage signal, and the second interference voltage signal is an instant high-voltage signal.

12. The charging system according to claim 10, wherein a voltage of the first interference voltage signal is lower than a voltage of the second interference voltage signal, and the first preset voltage value is less than the second preset voltage value.

13. The charging system according to claim 10, wherein the communication protection module further comprises a third protection unit connected before the first protection unit and the second protection unit, and the third protection unit comprises an anti-impact resistor and a resettable fuse which are connected in parallel.

14. The charging system according to claim 10, wherein 1-wire bus communication is performed between the communication terminal of the charging device and the communication terminal of the battery pack.

* * * * *